(12) United States Patent
McCormick et al.

(10) Patent No.: US 8,960,789 B2
(45) Date of Patent: Feb. 24, 2015

(54) CHILD VEHICLE SAFETY SEAT

(71) Applicant: Starla Jones, Logan, UT (US)

(72) Inventors: Matthew E. McCormick, Birmingham, MI (US); Vincent Hermann-Heinrich Jones, Findley, OH (US)

(73) Assignee: F Delta T LLC, Birmingham, MI (US)

(*) Notice: Subject to any disclaimer, the term of this patent is extended or adjusted under 35 U.S.C. 154(b) by 0 days.

(21) Appl. No.: 13/916,860

(22) Filed: Jun. 13, 2013

(65) Prior Publication Data
US 2013/0334848 A1    Dec. 19, 2013

Related U.S. Application Data

(60) Provisional application No. 61/659,063, filed on Jun. 13, 2012.

(51) Int. Cl.
*B60N 2/28* (2006.01)
*B60N 2/427* (2006.01)

(52) U.S. Cl.
CPC .............. *B60N 2/427* (2013.01); *B60N 2/2812* (2013.01); *B60N 2/286* (2013.01); *B60N 2/2863* (2013.01); *B60N 2/2884* (2013.01); *B60N 2/42709* (2013.01)
USPC .................................. 297/216.11; 297/216.19

(58) Field of Classification Search
USPC ............. 297/216.11, 216.16, 216.19, 256.13, 297/270.1, 326
See application file for complete search history.

(56) References Cited

U.S. PATENT DOCUMENTS

| | | | |
|---|---|---|---|
| 3,862,673 A * | 1/1975 | Benson | 297/471 |
| 5,110,182 A | 5/1992 | Beauvais | |
| 5,294,183 A * | 3/1994 | Wetter et al. | 297/216.11 |
| 5,462,333 A | 10/1995 | Beauvais | |
| 5,468,045 A * | 11/1995 | Weber | 297/216.11 |
| 5,551,751 A | 9/1996 | Sedlack | |
| 5,664,830 A | 9/1997 | Garcia | |
| 5,685,603 A | 11/1997 | Lane | |
| 5,722,719 A | 3/1998 | Glomstad | |
| 6,454,350 B1 | 9/2002 | Celestina-Krevh | |
| 6,513,870 B1 | 2/2003 | Takizawa | |
| 6,517,154 B2 | 2/2003 | Sawamoto | |
| 6,619,752 B1 | 9/2003 | Glover | |
| 6,641,211 B2 | 11/2003 | Takizawa | |
| 6,669,288 B2 | 12/2003 | Nakagawa | |
| 6,767,057 B2 | 7/2004 | Neelis | |
| 6,796,610 B2 | 9/2004 | Nakagawa | |
| 6,871,908 B2 | 3/2005 | Takizawa | |
| 6,938,954 B1 | 9/2005 | Hendren | |
| 6,983,832 B2 | 1/2006 | Namuduri | |
| 7,029,069 B2 | 4/2006 | Hendren | |
| 7,083,237 B2 | 8/2006 | Horton | |
| 7,219,958 B2 | 5/2007 | Yamazaki | |
| 7,270,373 B2 | 9/2007 | Sakumoto | |
| 7,390,064 B2 | 6/2008 | Horton | |
| 7,401,834 B2 | 7/2008 | Browne | |
| 8,348,337 B2 * | 1/2013 | Franck et al. | 297/216.11 |

* cited by examiner

*Primary Examiner* — Peter Brown
(74) *Attorney, Agent, or Firm* — Reising Ethington P.C.

(57) ABSTRACT

A child vehicle safety seat may include a seat base, a first side frame, a second side frame, a strap and belt assembly, and a compressible piece. The seat base is pivotally coupled to the first and second side frames. The strap and belt assembly is coupled to the side frames and to the compressible piece. Upon an exerted force, the seat base swings about a pivot axis defined by its pivotal coupling to the side frames. The compressible piece is compressed by the strap and belt assembly and the swinging movement of the seat base is dampened.

18 Claims, 3 Drawing Sheets

CHILD VEHICLE SAFETY SEAT

REFERENCE TO RELATED APPLICATIONS

This application claims the benefit of U.S. Provisional Ser. No. 61/659,063 filed on Jun. 13, 2012. The entire contents of which are incorporated herein by reference.

TECHNICAL FIELD

The disclosure generally relates to child safety seats for use in vehicles, and more particularly to ways of reducing forces felt by a child occupying the safety seat when a vehicle accident or other circumstances occur.

BACKGROUND

Child vehicle safety seats are placed in vehicles such as cars and are often secured by the car's seat belt or by a latch extending from the vehicle safety seat that is fixed to the car's interior. Child occupants are secured in the vehicle safety seats for car travel. In the event of a car accident, such as a front or rear impact, the resulting forces can sometimes be transferred to the child occupant.

SUMMARY

One embodiment of a child vehicle safety seat may include a seat base, a first side frame, a second side frame, a shoulder belt, a compressible piece, a first strap, and a second strap. The seat base is for receiving a child occupant. The first side frame is pivotally coupled to the seat base, and the second side frame is pivotally coupled to the seat base. The shoulder belt can be coupled to the first side frame, to the second side frame, or to both side frames. The first strap can be coupled to the first side frame, to the second side frame, or to both side frames. The first strap is coupled to the compressible piece. The second strap is coupled to the compressible piece and extends to the shoulder belt. The second strap and the shoulder belt can interconnect in order to secure the child occupant in the seat base. Upon an exerted force, the seat base swings about a pivot axis defined in part or more by its pivotal coupling to the first and second side frames. When swung in a first swinging direction, the first strap compresses the compressible piece and dampens swinging movement of the seat base in the first swinging direction. When swung in a second swinging direction, the second strap compresses the compressible piece and dampens swinging movement of the seat base in the second swinging direction.

Another embodiment of a child vehicle safety seat may include a seat base, a first side frame, a second side frame, a compressible piece, and a strap and belt assembly. The seat base is for receiving a child occupant. The first and second side frames are pivotally coupled to the seat base and include one or more cross-bars extending between them. The compressible piece is coupled to the seat base. The strap and belt assembly includes one or more straps and one or more belts. The strap and belt assembly is coupled to the one or more cross-bars and to the compressible piece. Upon an exerted force, several things happen. The seat base and compressible piece swing about a pivot axis that is defined in part or more by the pivotal coupling between the first side frame and the seat base and between the second side frame and the seat base. The seat base and compressible piece swing in a general arc movement, and swing relative to the first and second side frames. The first and second side frames remain unswung. And the strap and belt assembly compresses the compressible piece to cause dampening of the swinging movement of the seat base.

DRAWINGS

The following detailed description of preferred embodiments and best mode will be set forth with reference to the accompanying drawings, in which.

DETAILED DESCRIPTION

Figure 1:
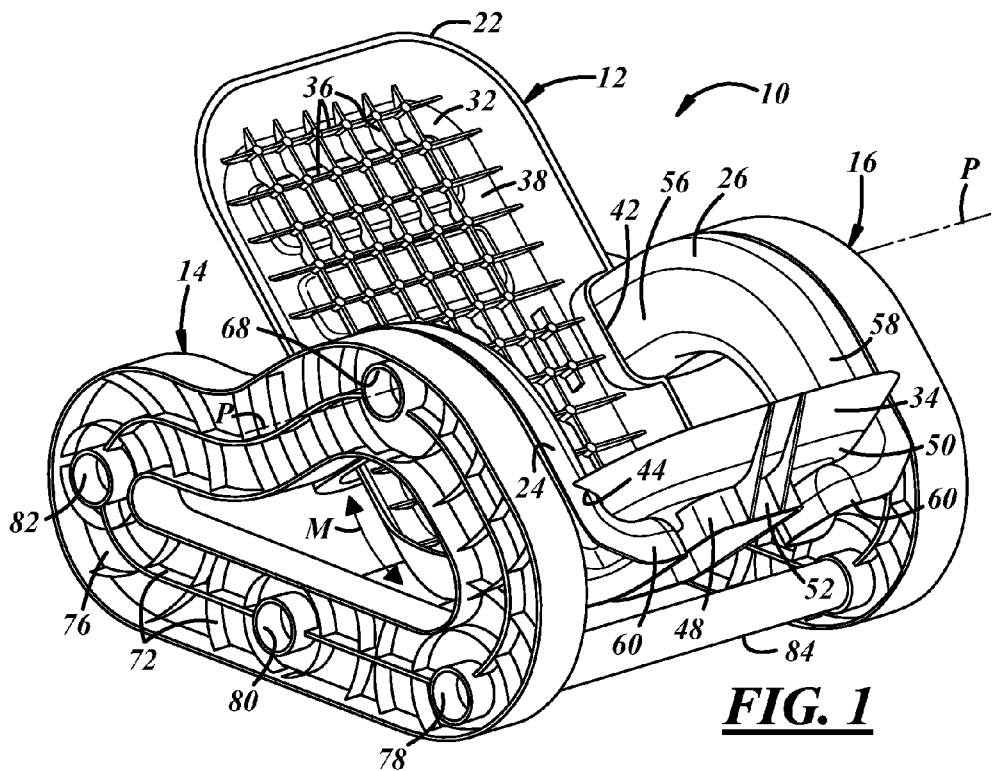
FIG. 1 is a perspective top view of some components of one embodiment of a child vehicle safety seat.

Referring to the drawings, a child vehicle safety seat 10 is designed and constructed to reduce forces felt by a child occupant in the event of a vehicle accident or some other circumstance in which the vehicle is abruptly stopped. The forces exerted during an accident are lessened with respect to the child occupant via a combined swinging motion and dampening effect of the safety seat 10. The child occupant therefore experiences less of the forces compared to forces felt by a child occupant seated in previously-known child car seats that are themselves stationary structures and are not designed to have the swinging motion and dampening effect of the safety seat 10. As used herein, a vehicle includes a passenger car, sport utility vehicle, truck, or the like.

Figure 2:
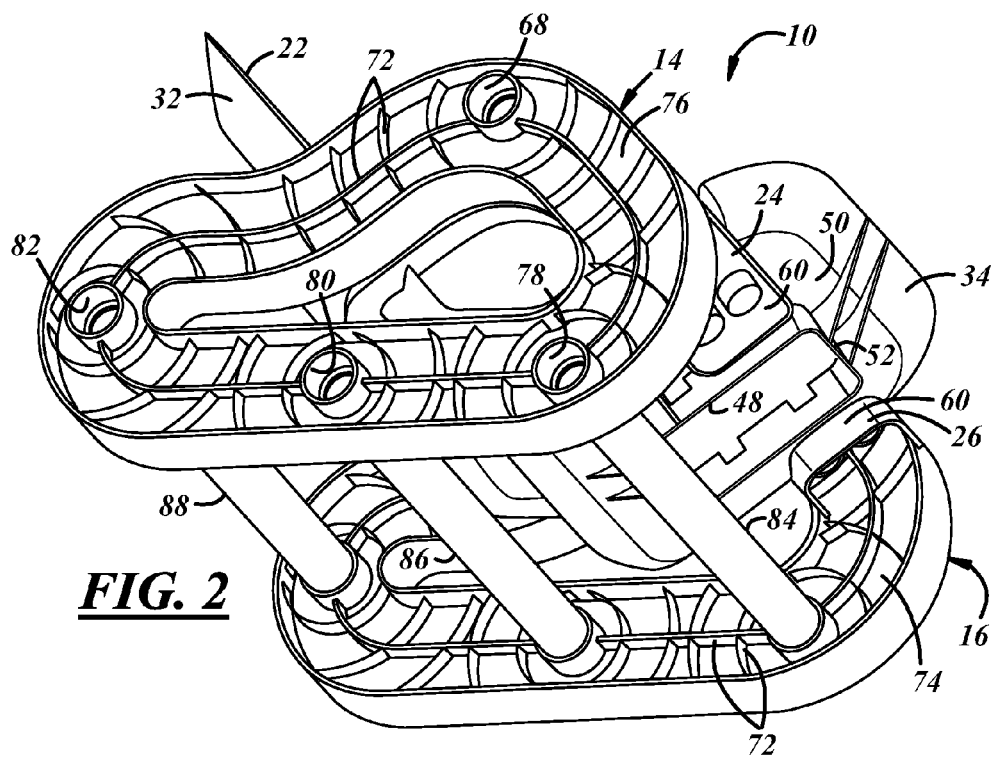
FIG. 2 is a perspective bottom view of the child vehicle safety seat of FIG. 1.
Figure 3:
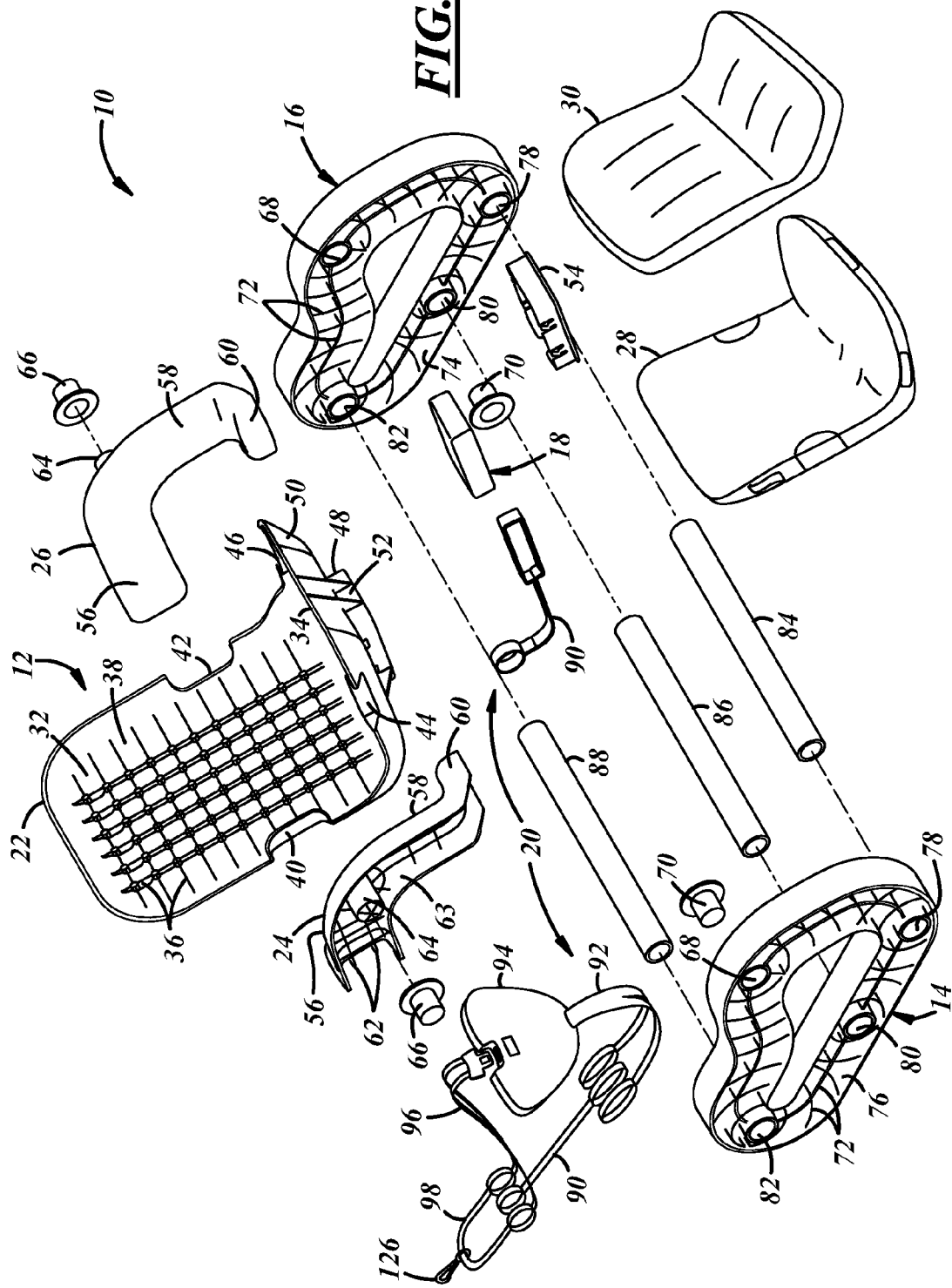
FIG. 3 is an exploded view of the child vehicle safety seat of FIG. 1, the exploded view showing additional components of the child vehicle safety seat.

The child vehicle safety seat 10 can have different designs and constructions depending upon, among other considerations, the vehicle in which the safety seat will be installed in and the size of the child occupant to be secured in the safety seat. Referring to FIGS. 1-4, for example, in one embodiment the safety seat 10 can include a seat base 12, a pair of side frames 14, 16, a compressible piece 18, and a strap and belt assembly 20. The seat base 12 directly receives the child occupant and supports the child occupant's body in the safety seat 10. The seat base 12 can have different designs and constructions depending upon, among other considerations, the design and construction of other components of the safety seat 10. Referring to FIGS. 1-3, for example, in this embodiment the seat base 12 can have a base structure 22, a first arm 24, a second arm 26, a cushion 28, and a cover 30.

The base structure 22 provides the structural integrity needed to support the weight of the child occupant. The base structure 22 can be made of a plastic material, and can be formed via an injection molding process; of course other materials and other formation processes are possible. The base structure 22 has a back portion 32 and a bottom portion 34, and can have numerous criss-crossing ribs 36 to strengthen the back and bottom portions. The back and bottom portions 32, 34 are named with respect to the body parts of the child occupant generally received thereby. The ribs 36 project from a top surface 38 of the base structure 22. Referring in particular to FIG. 3, a first and second notch 40, 42 are located in opposite edges of the back portion 32 in order to respectively receive sections of the first and second arms 24, 26 in assembly; likewise, a third and fourth notch 44, 46 are located in opposite edges of the bottom portion 34 in order to respectively receive sections of the first and second arm in assembly. The notches 40, 42, 44, 46 and the arms 24, 26 can fit snugly together.

Referring now to FIGS. 2 and 3, a housing 48 is located at a bottom surface 50 of the base structure 22 for containing the compressible piece 18. The housing 48 is located in particular at the bottom portion 34. The housing 48 has four walls projecting vertically from the bottom surface 50 in the general shape of a rectangle that defines a compartment for receiving the compressible piece 18. A front wall 52 and a rear wall (not shown) can have slots (also not shown) for permitting passage of components of the strap and belt assembly 20. To close the housing 48 and contain the compressible piece 18, a lid 54 of the housing 48 can connect to the four walls via a press-fit, snap-fit, clip-fit, or other connection. The housing 48 could have other locations in other embodiments such as the back portion 32, and likewise the housing could have other constructions apart from a walled structure.

Referring to FIGS. 1 and 3, and as already mentioned, sections of the first and second arms 24, 26 are inserted into the notches 40, 42, 44, 46 of the base structure 22 for coupling the components together, and the first and second arms are pivotally coupled respectively to the first and second side frames 14, 16. The arms 24, 26 can be made of a plastic material, and can be formed via an injection molding process; of course other materials and other formation processes are possible. Each of the first and second arms 24, 26 has a first end section 56 that is shaped somewhat complementary to the first and second notches 40, 42 for reception therein, and each of the first and second arms has a second end section 58 that is shaped somewhat complementary to the third and fourth notches 44, 46 for reception therein. At the second end sections 58, the first and second arms 24, 26 each have a foot portion 60 that is placed underneath the bottom portion 34 and can abut the bottom surface 50.

For strengthening the structure of the first and second arms 24, 26, numerous criss-crossing ribs 62 project from back surfaces 63 of the first and second arms (only those on the first arm are shown). And to provide the pivotal coupling to the first and second side frames 14, 16, in this embodiment the first and second arms 24, 26 each have an extension 64 projecting from their respective back surfaces 63. Flanged bushings 66 can be fitted over or into the extensions 64 to facilitate pivotal swinging movement of the seat base 12, as will be described below. The flanged bushings 66 can then be inserted into bores 68 of the first and second side frames 14, 16, or can be inserted into complementary flanged bushings 70 of the first and second side frames which themselves are inserted into the bores. Other ways of providing this pivotal coupling and movement are possible, including couplings with or without bushings and with or without bearings.

Referring now to FIG. 3, the cushion 28 provides a padding over the base structure 22 for giving comfort to the child occupant rested against it. The cushion 28 can be attached to the base structure 22 via velcro, buttons, ties, other attachment techniques, or need not be attached at all in which case the cover 30 would keep the cushion against the base structure. The cover 30 is fitted over the cushion 28 and can be made of a fabric material suitable for direct contact with the child occupant, and optionally can be stain resistant. The cover 30 can be fitted over the cushion 28 and to the seat base 12 via stretching, velcro, buttons, ties, or other attachment techniques. In other embodiments not shown in the figures, the cushion and cover could be combined—such as sewn together—as a single component.

The first and second side frames 14, 16 provide a supporting structure for other components of the child vehicle safety seat 10, including support of the pivotal swinging movement of the seat base 12. The first and second side frames 14, 16 can have different designs and constructions depending upon, among other considerations, the design and construction of other components of the safety seat 10. Referring to FIGS. 1-3, for example, in this embodiment the first and second side frames 14, 16 support the seat base 12 on opposite sides of the seat base. The side frames 14, 16 can be made of a plastic material, and can be formed via an injection molding process; of course other materials and other formation processes are possible.

For strengthening their structures, numerous criss-crossing ribs 72 project from inner and outer surfaces 74, 76 of the first and second side frames 14, 16. Though shown with the ribbing exposed in the figures, in application the child vehicle safety seat 10 could have an outer covering and outer structure for a more aesthetic and ergonomical feel and design. In addition to the bores 68, the first and second side frames 14, 16 each have first, second, and third bores 78, 80, and 82 that respectively receive and support first, second, and third crossbars 84, 86, and 88. The bores can be defined completely through the first and second side frames 14, 16. The crossbars 84, 86, 88 couple the first and second side frames 14, 16 together, and can be cylindrical tubes or another coupling structure. The cross-bars 84, 86, 88 can be press-fitted into the respective bores 78, 80, 82, or can be attached in other ways. As shown best in FIG. 2, the cross-bars 84, 86, 88 are located below the seat base 12 so that the seat base has a clearance above the cross-bars for its pivotal swinging movement.

The compressible piece 18 can take in and absorb some of the energy and forces exerted to and by the pivotal swinging movement of the seat base 12, and thereby dampens and dissipates the swinging movement in order to bring the seat base to rest following the exertion of energy and forces. The compressible piece 18 can have different designs and constructions depending upon, among other considerations, the design and construction of other components of the safety seat 10 and the expected energy and forces exerted to the compressible piece. Referring to FIG. 3, for example, in this embodiment the compressible piece 18 is a rectangularly-shaped piece made of a foam material with an approximately 30 durometer hardness value; of course, in other embodiments, other shapes, materials, and hardness values are possible. The compressible piece 18 can be hard and stiff enough in order to keep the child vehicle safety seat 10 at relative rest and not swinging during normal vehicle travel and circumstances. In assembly the compressible piece 18 is contained within the housing 48, and in use the compressible piece is depressed and squeezed by the strap and belt assembly 20. To locate and maintain the strap and belt assembly 20 onto and over the compressible piece 18, grooves can be defined in an outer surface of the compressible piece that complement the width and depth of components of the strap and belt assembly.

Figure 4:
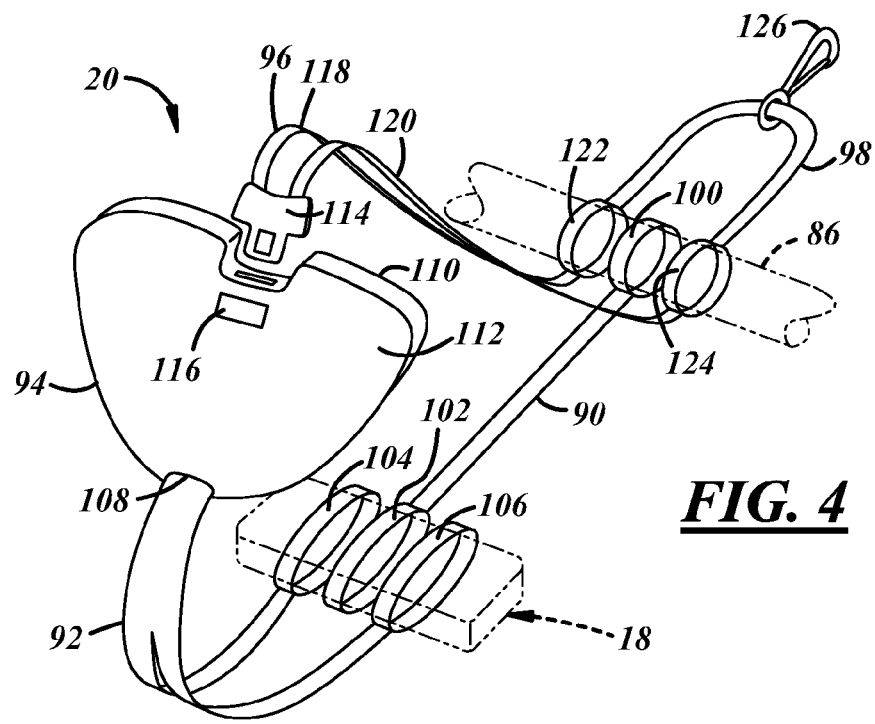
FIG. 4 is a perspective view of one embodiment of a strap and belt assembly that can be a component of the child vehicle safety seat of FIG. 1.

The strap and belt assembly 20 helps transfer some of the energy and forces exerted to and by the pivotal swinging movement to the compressible piece 18. Furthermore, the strap and belt assembly 20 secures the child occupant in the child vehicle safety seat 10. The strap and belt assembly 20 can have different designs, constructions, and components depending upon, among other considerations, the design and construction of other components of the safety seat 10. Referring to FIGS. 3 and 4, for example, in a first embodiment the strap and belt assembly 20 can include a first strap 90, a second strap 92, a receptacle 94, a shoulder belt 96, and a latch 98. The straps 90, 92, shoulder belt 96, and latch 98 can be made of a strong polyester fabric material or another suitably-strong material, and can all have adjustable lengths to accommodate child occupants of various sizes.

The first strap 90 is coupled to the first and second side frames 14, 16 via a first end 100 of the first strap wrapped and looped around the second cross-bar 86. Similarly, the first strap 90 is coupled to the compressible piece 18 via a second end 102 of the first strap wrapped and looped around the compressible piece. The second strap 92 has a pair of ends 104, 106 that are wrapped and looped around the compressible piece 18, and has its other end 108 fixedly coupled to the receptacle 94. Though not shown, the second strap 92 can be padded for giving comfort to the child occupant. Furthermore, the second strap 92 can be fed through the seat base 12 via a slot located through the bottom portion 34, through the cushion 28, and through the cover 30. In assembly, the ends 104, 106 generally confront the bottom surface 50 of the base structure 22, while the end 108 generally confronts the top surface 38. Instead of wrapping and looping around, the first and second straps 90, 92 could be coupled to the compressible piece 18 in other ways that transfer some of the energy and forces exerted to the compressible piece including being an integral part of the compressible piece or transferring the energy and forces via an intermediate component or structure.

Still referring to FIGS. 3 and 4, the receptacle 94 can be pressed against or can be generally located at the child occupant's chest when the child occupant is secured in the child vehicle safety seat 10. Accordingly, like other components making contact with the child occupant, the receptacle 94 can be padded for giving comfort to the child occupant. The receptacle 94 has a back surface 110 directly confronting the child occupant, and has a front surface 112 opposite the back surface. In the first embodiment, the receptacle 94 is designed and constructed to receive a buckled end 114 of the shoulder belt 96, and has a release button 116 for selectively removing the buckled end once the buckled end is engaged with the receptacle.

The shoulder belt 96 is secured over the child occupant's shoulders to help secure the child occupant in the safety seat 10, and, like other components, can be padded for comfort. In the first embodiment, the shoulder belt 96 has a first belt 118 and a second belt 120—one for placement over each shoulder of the child occupant. The first and second belts 118, 120 are fixedly coupled to the buckled end 114. The buckled end 114 can constitute the male member of a conventional buckle mechanism, and the receptacle 94 and release button 116 can constitute the female member of the buckle member that receives the buckled end; a conventional buckle mechanism will be known to skilled artisans and thus its description need not be provided here. Opposite the buckled end 114, the shoulder belt 96 is coupled to the first and second side frames 14, 16 via a first and second end 122, 124 wrapped and looped around the second cross-bar 86; in other embodiments not shown in the figures, the first and second ends of the shoulder belt could be wrapped and looped around the third cross-bar 88 or could be coupled to the side frames in other ways. In the first embodiment, the latch 98 extends from the shoulder belt 96 and has a clip 126 that can be clipped to a fixed component of the vehicle's interior. In this way, the latch 98 fixes the safety seat 10 to the vehicle.

Figure 5:
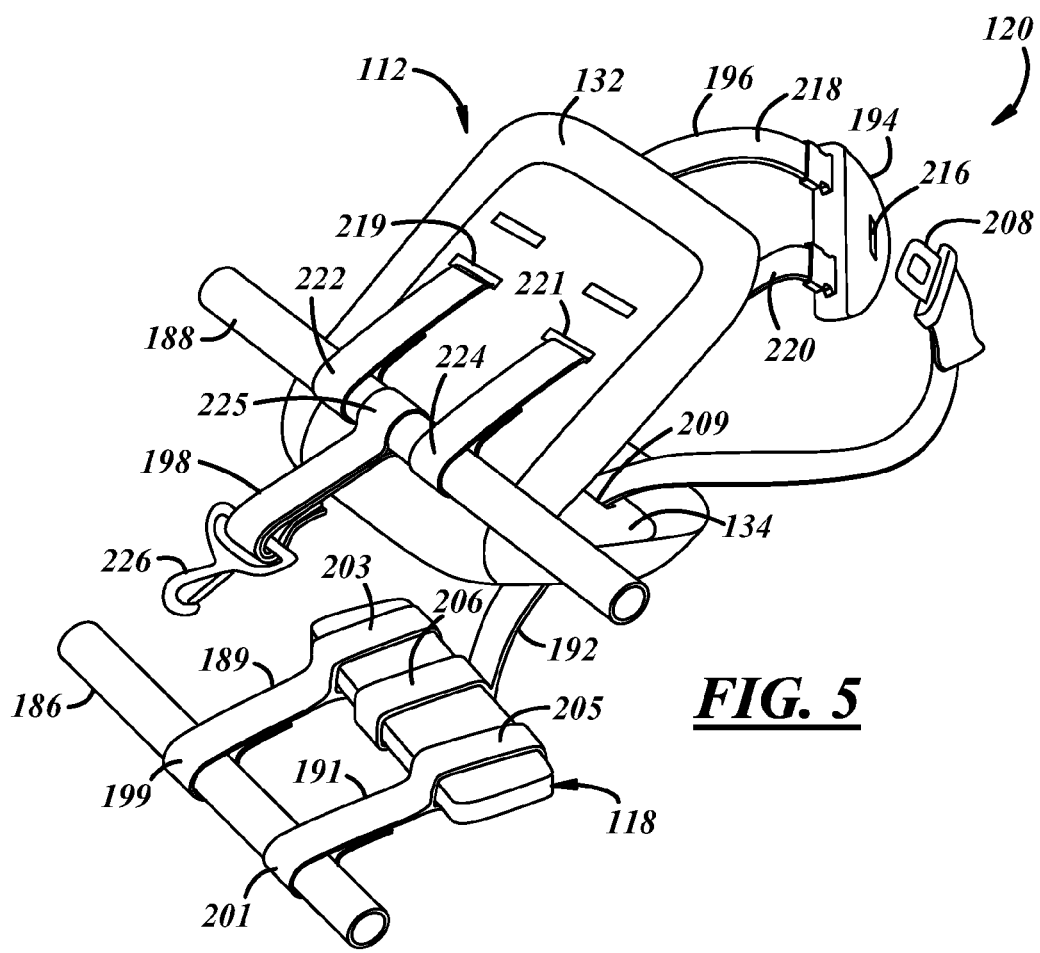
FIG. 5 is a perspective view of another embodiment of a strap and belt assembly that can be a component of the child vehicle safety seat of FIG. 1.

FIG. 5 shows a second embodiment of the strap and belt assembly. For the second embodiment, components generally corresponding to components of the first embodiment are numbered with numerals that are set off by 100 compared to numerals in the first embodiment. A strap and belt assembly 120 of the second embodiment can include a first pair of straps 189, 191, a second strap 192, a receptacle 194, a shoulder belt 196, and a latch 198. The first pair of straps 189, 191 are coupled to the first and side frames 14, 16 via a respective first and second end 199, 201 wrapped and looped around a second cross-bar 186. Similarly, the first pair of straps 189, 191 are coupled to a compressible piece 118 via a third and fourth end 203, 205 wrapped and looped around the compressible piece. The second strap 192 has a first end 206 wrapped and looped around the compressible piece 118, and has a buckled end 208 releasably received in the receptacle 194. The second strap 192 is fed through a seat base 112 via a slot 209 defined through a bottom portion 134 of the seat base 112.

Still referring to FIG. 5, in the second embodiment the receptacle 194 receives the buckled end 208 of the second strap 192, and has a release button 216 for selectively removing the buckled end once engaged. The receptacle 194 also can removably receive ends of the shoulder belt 196; here, the coupling can be via a buckle mechanism, a clip mechanism, a fixed coupling, or another coupling. The shoulder belt 196 has a first belt 218 and a second belt 220—one for placement over each shoulder of the child occupant. The first and second belts 218, 220 are respectively fed through slots 219, 221 defined through a back portion 132 of the seat base 112. Another pair of slots can be provided to adjust the height of the shoulder belt 196 with respect to the height of the child occupant. The shoulder belt 196 is coupled to the first and second side frames 14, 16 via a first and second end 222, 224 wrapped and looped around a third cross-bar 188. And lastly, the latch 198 is coupled to the first and second side frames 14, 16 via an end 225 wrapped and looped around the third cross-bar 188, and the latch has a clip 226 that can be clipped to a fixed component of the vehicle's interior.

In use, the child vehicle safety seat 10 reduces forces felt by the child occupant that is secured in the safety seat in the event of a vehicle accident such as a front or rear impact or in the event of another circumstance causing an abrupt halt of the vehicle. Referring to FIG. 1, upon vehicle impact, the seat base 12 can be caused to swing about a pivot axis P that is defined by the pivotal coupling between the first and second arms 24, 26 and the first and second side frames 14, 16. The seat base 12 thus moves in a pendulum-like swinging arc movement M relative to the unswung first and second side frames 14, 16. Depending on whether the safety seat 10 is facing forward in the direction of vehicle travel or rearward, a front vehicle impact sends the seat base swinging in a first swinging direction while a rear vehicle impact sends the seat base swinging in an opposite swinging direction. As an example, when initially swung in the first swinging direction, the first strap 90 is pulled with the seat base 12 via its coupling to the compressible piece 18 until it is tightly drawn and consequently squeezes and compresses the compressible piece. The first end 100 of the first strap 90 remains with the unswung second cross-bar 86 while the second end 102 moves with the compressible piece 18 and the swinging seat base 12. The seat base's movement in the first swinging direction is therefore dampened and dissipated, via the squeezed and compressed piece 18, and the forces and energy of the vehicle impact is in turn depleted over the distance and the time of the movement and compression events. Here, the second strap 92 can be somewhat loosely slacked, or can also be tightly drawn in which case it too would squeeze and compress the compressible piece 18.

In the second swinging direction, similar actions would occur with the second strap 92 and the compressible piece 18 and the seat base's movement would therefore also be dampened and dissipated. That is, the second strap 92 is pulled with the seat base 12 via its coupling to the compressible piece 18 until it is tightly drawn and consequently squeezes and compresses the compressible piece. The ends 122, 124 remain with the unswung second cross-bar 86, while the ends 104, 106 move with the compressible piece 18 and the swinging seat base 12. Instead of remaining stationary like previously-known child car seats, the child vehicle safety seat 10 has a dampened swinging movement that absorbs some or all of the energy and forces exerted during a vehicle impact, and lessens or eliminates the forces upon the child occupant.

In other embodiments not shown in the figures, the child vehicle safety seat can have different designs and constructions, and can have more, less, or different components than those shown and described herein. For example, the arms and base structure of the seat base could be made as a one-piece component, or the arms need not be provided at all in which case the base structure itself could be pivotally coupled to the side frames.

While the forms of the embodiments herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A child vehicle safety seat, comprising:
   a seat base for receiving a child occupant;
   a first side frame pivotally coupled to said seat base, and a second side frame pivotally coupled to said seat base;
   a shoulder belt coupled to said first side frame, to said second side frame, or to both said first and second side frames;
   a compressible piece;
   a first strap coupled to said first side frame, to said second side frame, or to both said first and second side frames, said first strap coupled to said compressible piece; and
   a second strap coupled to said compressible piece and extending to said shoulder belt, said second strap and said shoulder belt interconnecting to secure the child occupant in said seat base; and
   wherein, upon an exerted force, said seat base swings about a pivot axis defined by its pivotal coupling to said first and second side frames, and when swung in a first swinging direction said first strap compresses said compressible piece and dampens swinging movement of said seat base in the first swinging direction, and when swung in a second swinging direction said second strap compresses said compressible piece and dampens swinging movement of said seat base in the second swinging direction.

2. A child vehicle safety seat as set forth in claim 1, wherein said seat base has a base structure with a back portion and a bottom portion, has a first arm coupled to said base structure, and has a second arm coupled to said base structure.

3. A child vehicle safety seat as set forth in claim 1, further comprising at least one first bushing provided at the pivotal coupling between said first side frame and said seat base, and at least one second bushing provided at the pivotal coupling between said second side frame and said seat base.

4. A child vehicle safety seat as set forth in claim 1, further comprising a receptacle releasably buckled to said shoulder belt and coupled to said second strap.

5. A child vehicle safety seat as set forth in claim 1, wherein said seat base has a housing with at least one wall for containing said compressible piece.

6. A child vehicle safety seat as set forth in claim 1, wherein said first and second side frames comprise at least one cross-bar coupled to said first side frame and coupled to said second side frame.

7. A child vehicle safety seat as set forth in claim 6, wherein said shoulder belt is coupled to said at least one cross-bar.

8. A child vehicle safety seat as set forth in claim 7, wherein said first strap is coupled to said at least one cross-bar.

9. A child vehicle safety seat as set forth in claim 1, wherein said first and second side frames comprise a first cross-bar and a second cross-bar, said first and second cross-bars coupled to said first side frame and coupled to said second side frame.

10. A child vehicle safety seat as set forth in claim 9, wherein said shoulder belt is coupled to said first cross-bar and said first strap is coupled to said second cross-bar.

11. A child vehicle safety seat as set forth in claim 1, wherein said compressible piece comprises a foam material.

12. A child vehicle safety seat as set forth in claim 1, further comprising a latch extending from the child vehicle safety seat in order to fix the child vehicle safety seat to an interior of the vehicle.

13. A child vehicle safety seat as set forth in claim 1, wherein, upon the exerted force, said seat base swings about said pivot axis in a swinging arc movement.

14. A child vehicle safety seat as set forth in claim 13, wherein, upon the exerted force, said seat base swings about said pivot axis relative to said first and second side frames, and said first and second side frames remain unswung.

15. A child vehicle safety seat as set forth in claim 14, wherein said compressible piece is coupled to said seat base, and, upon the exerted force, said compressible piece swings with said seat base.

16. A child vehicle safety seat, comprising:
   a seat base for receiving a child occupant;
   a first side frame pivotally coupled to said seat base, and a second side frame pivotally coupled to said seat base, said first and second side frames including at least one cross-bar extending between said first and second side frames;
   a compressible piece coupled to said seat base; and
   a strap and belt assembly including at least one strap and at least one belt, said strap and belt assembly coupled to said at least one cross-bar and coupled to said compressible piece;
   wherein, upon an exerted force, said seat base and said compressible piece swing about a pivot axis defined by the pivotal coupling between said first side frame and said seat base and between said second side frame and said seat base, said seat base and said compressible piece swing in a general arc movement and swing relative to said first and second side frames, said first and second side frames remain unswung, and said strap and belt assembly compresses said compressible piece to cause dampening of the swinging movement of said seat base.

17. A child vehicle safety seat as set forth in claim 16, further comprising at least one first bushing provided at the pivotal coupling between said first side frame and said seat base, and at least one second bushing provided at the pivotal coupling between said second side frame and said seat base.

18. A child vehicle safety seat as set forth in claim 16, wherein said compressible piece comprises a foam material.

* * * * *